United States Patent [19]

Wang et al.

[11] 4,410,500

[45] Oct. 18, 1983

[54] SODIUM-LIMESTONE DOUBLE ALKALI FLUE GAS DESULFURIZATION METHOD

[75] Inventors: Kuei-Hsiung Wang, Arlington Heights; Robert J. Biolchini, Hanover Park; L. Karl Legatski, Wheaton, all of Ill.

[73] Assignee: FMC Corporation, Philadelphia, Pa.

[21] Appl. No.: 376,879

[22] Filed: May 10, 1982

[51] Int. Cl.$^3$ .............................................. C01B 17/00
[52] U.S. Cl. .................................. 423/242; 423/166; 423/512 A
[58] Field of Search .......... 423/242 A, 242 R, 512 A, 423/244 A, 244 R, 166

[56] References Cited

U.S. PATENT DOCUMENTS

| | | | |
|---|---|---|---|
| 3,607,033 | 9/1971 | Shah | 423/540 |
| 3,775,532 | 11/1973 | Shah | 423/242 |
| 3,840,638 | 10/1974 | Morita et al. | 423/166 |
| 3,848,070 | 11/1974 | Onozuka et al. | 423/242 |
| 3,911,084 | 10/1975 | Wall et al. | 423/242 |
| 3,944,649 | 3/1976 | Field et al. | 423/242 |
| 3,961,021 | 6/1976 | Morita et al. | 423/242 |
| 3,965,242 | 6/1976 | Morita et al. | 423/166 |
| 3,989,796 | 11/1976 | Morita et al. | 423/242 |
| 3,989,797 | 11/1976 | Brady et al. | 423/242 |
| 4,021,202 | 5/1977 | Field et al. | 422/172 |
| 4,331,640 | 5/1982 | Morita et al. | 423/242 |

OTHER PUBLICATIONS

EPA-600/7-77-074, Oberholtzer et al., Laboratory Study of Limestone Regeneration in Dual Alkali Systems, Jul., 1977.

EPA-600/7-81-141b, Valencia et al., "Evaluation of the Limestone Dual Alkali Prototype System at Plant Scholz", 1981.

EPA-600/7-77-050b, C. R. LaMantia et al., "Final Report: Dual Alkali Test and Evaluation Program," vol. II, Chapter VI, May 1977.

*Primary Examiner*—Gregory A. Heller
*Attorney, Agent, or Firm*—Christopher Egolf

[57] ABSTRACT

A flue gas desulfurization method for efficiently removing sulfur oxides from a gas stream with an aqueous sodium sulfite- and sodium bisulfite-containing absorption solution, in which absorber effluent solution at a pH of from 5.8 to 6.6 and having an active sodium concentration of from 0.5 M to 0.9 M is regenerated with sufficient ground limestone to yield a treated solution with a higher pH of from 6.3 to 7.0 and whose bisulfite concentration is reduced by from 35 to 70%.

18 Claims, 1 Drawing Figure

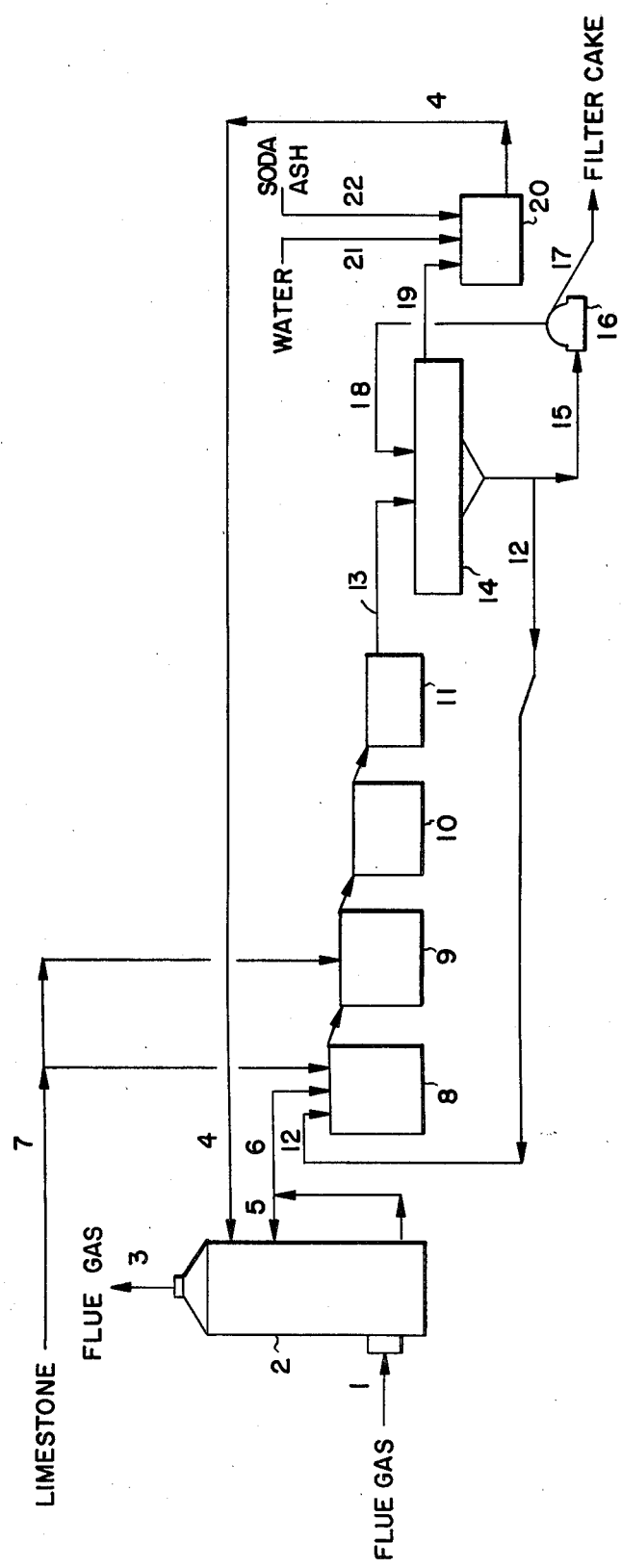

SODIUM-LIMESTONE DOUBLE ALKALI FLUE GAS DESULFURIZATION METHOD

BACKGROUND OF THE INVENTION

This invention relates to a flue gas desulfurization process that utilizes a sodium sulfite- and sodium bisulfite-containing alkaline absorption solution regenerated with limestone.

Flue gas desulfurization processes that employ alkaline absorption solutions containing both sodium sulfite and sodium bisulfite for removing sulfur oxides like $SO_2$ from flue gases are well known and are normally operated continuously with the spent absorption solution being regenerated with lime or limestone. Such lime/limestone-sodium salt processes are often termed "double" or "dual" alkali processes in contradistinction to single alkali processes that directly treat the flue gas with lime or limestone.

Double alkali processes that utilize lime as the regenerating agent are in commercial use throughout the United States. U.S. Pat. No. 3,911,084 issued to Wall et al. discloses one such lime-sodium double alkali process.

Double alkali processes described in the patent literature which provide for the efficient utilization of lime, as the regenerating agent, often suggest that limestone may be substituted for lime. Such a substitution, however, is not at all straightforward, since operating factors such as desulfurization efficiency, regenerating agent utilization (reaction rate and reaction completion), and by-product solid physical characteristics are distinctly different for these two chemical regenerating agents.

It is instructive to note that despite definite cost advantages of limestone over lime, no limestone-sodium double alkali processes are in commercial use in the United States. This is apparently so because no efficient procedures have been devised for operating such processes competitively with lime-sodium double alkali processes.

Limestone-sodium double alkali processes that are described in the prior art provide for efficient absorption typically by sacrificing efficiency during the regeneration operation. U.S. Pat. No. 3,848,070 issued to Onozuka et al., No. 3,944,649 issued to Field et al. and No. 3,989,796 issued to Morita et al., teach that at least a stoichiometric amount of limestone should be employed in the complete neutralization of the bisulfite during regeneration. Such prior art processes, moreover, are generally operated with relatively high alkali sulfite/bisulfite concentrations in the absorption solution to maximize $SO_2$-absorption capacity, but this mode of operation requires significant alkali make-up to compensate for process solution losses.

The present invention provides a method for operating a limestone-sodium double alkali flue gas desulfurization process with superior efficiency in both the absorption and regeneration operations.

SUMMARY OF THE INVENTION

In accordance with the present invention, flue gas is continuously desulfurized in an absorber with an aqueous solution of soidum sulfite and sodium bisulfite and such solution is regenerated with limestone in the improvement which comprises contacting absorber effluent solution, having a pH within the range of 5.8 to 6.6, with sufficient ground limestone to raise the pH to a value within the range of from 6.3 to 7.0 and to convert from 35 to 70% of the solution bisulfite content to sulfite, separating the by-product solids from the limestone-treated solution, and returning the regenerated solution to the absorber, the molar concentration of active sodium in the absorber effluent solution, measured as the sum of the bisulfite molar concentration plus twice the sulfite molar concentration, being maintained within the range of from 0.5 M to 0.9 M, and the amount of limestone being less than stoichiometric, based on the theoretical calcium carbonate required to completely neutralize the bisulfite content of such absorber effluent solution to sulfite.

In preferred embodiments of the invention, the amount of ground limestone contacted with the absorber effluent solution is sufficient to reduce the bisulfite concentration of such effluent solution by an amount of from 0.5 M to 0.5 M, more preferably 0.1 M to 0.3 M.

The ground limestone is preferably substantially all smaller than No. 200 (75-$\mu$m) Sieve in particle size, preferably smaller than No. 325 (45-$\mu$m) Sieve, and of a relatively narrow particle size distribution. The amount of limestone introduced into the absorber effluent solution is preferably no more than about 85% of a stoichiometric amount, based on the theoretical amount of calcium carbonate required to completely neutralize the bisulfite content of such absorber solution to sulfite, and is more preferably from 35 to 80% of stoichiometric.

The reaction of the limestone with diverted absorber effluent solution is preferably carried out in a multistage reactor, desirably having from 2 to 4 reaction stages, with the limestone being introduced into the initial reactor stages.

BRIEF DESCRIPTION OF THE DRAWING

The drawing illustrates a schematic flow diagram for a preferred embodiment of the invention which desulfurizes flue gas from a large boiler fueled with high-sulfur coal.

DETAILED DESCRIPTION

The continuous process of this invention treats flue or waste gases that contain sulfur oxides, resulting from the combustion of sulfur-containing fuels. It is particularly suited for the treatment of flue gas streams from the combustion of high sulfur fuels. Among the various sulfur oxides that may be present in typical flue gases, sulfur dioxide ($SO_2$) is the most significant and will be referred to in the description of the invention which follows. The process is not limited with respect to the type of flue or waste gas streams or to any particular type of fuel.

The overall process may be characterized as having two subsystems, an absorption section and a regeneration section. The absorption of the sulfur dioxide and other sulfur oxides from the flue gas stream is effected with an aqueous solution containing sodium sulfite and sodium bisulfite.

The principal reaction that occurs in the absorber solution as a consequence of the absorption of sulfur dioxide is the conversion of sodium sulfite to sodium bisulfite. Sodium sulfate may also be formed incidentally by the oxidation of sodium sulfite in solution with oxygen in the flue gas.

In the regeneration section of the process, effluent solution from the absorption section is treated with limestone (calcium carbonate) to regenerate sodium sulfite from sodium bisulfite. The regeneration reaction yields a solid byproduct, primarily calcium sulfite with calcium sulfate, if present, being co-precipitated. Special procedures for selectively removing calcium sulfate are thus not required in this invention.

It has been discovered that both the absorption and regeneration procedures may be operated with good efficiency in the present invention through precise control of certain critical parameters. The important parameters include pH of the absorption effluent solution, pH of the regenerated absorption solution, the percentage of bisulfite that is reacted to sulfite in the effluent solution, the concentration of active sodium in the absorption solution and the absolute decrease in bisulfite concentration during regeneration of the effluent solution.

The absorption and regeneration process chemistry may be efficiently maintained within a desired operating envelope by specifying as few as three of the critical parameters. Two of the three parameters should be selected from the group of absorption effluent solution pH, regenerated absorption solution pH, and percentage of absorption effluent solution bisulfite content that is converted during regeneration to sulfite. The third parameter is the "active sodium" content of the aqueous sodium sulfite- and sodium bisulfite-containing absorption solution. In lieu of, or in addition to active sodium content, the absolute decrease in bisulfite concentration during regeneration of the effluent solution may also be controlled.

The "active sodium" concentration of the absorber effluent solution is a measure of its absorptive capacity and is conveniently defined as, and measured by, the sum of the bisulfite molar concentration plus twice the sulfite molar concentration in the absorber effluent solution. This presumes that any sodium carbonate, sodium hydroxide and/or sodium bicarbonate from alkali make-up is present in small concentrations, i.e., typically much less than 0.1 M, since such alkali would have reacted during absorption with sulfur dioxide to form sulfite/bisulfite in the absorber effluent solution.

Although three parameters are ordinarily required to define the specific operating points within the desired operating envelope of the invention, it should be evident that inclusion of additional parameters defines the limits or confines of the desired operating envelope with even more precision.

At this point, it should be cautioned that a distinction is normally made between operation of flue gas desulfurization systems under normal, expected conditions versus operation during dynamic turndown conditions. The parameter ranges defined below are primarily applicable to normal, expected conditions for steady state, continuous operation of the absorption and regeneration subsystems. During dynamic turndown periods, when the normal volume of $SO_2$-containing flue gas is decreased (as when a boiler is operated at only half capacity) or when the $SO_2$ content of the gas stream changes (due to sulfur variations in fuel), the system chemistry will shift to a different point within the operating envelope. When such dynamic turndowns are drastic, it is possible that the system chemistry could deteriorate sufficiently to shift outside the desired operating envelope, i.e., excursions outside of one or more of the parameter ranges specified below would occur.

The pH of the regenerated absorption solution should be maintained within the range of from 6.3 to 7.0, preferably from 6.4 to 6.8. The higher pH values within these ranges are preferred because they promote efficient absorption of sulfur dioxide in the absorber. Regeneration pH values in excess of 7.0 are not desirable because limestone utilization efficiency decreases at such higher pH's. Regeneration pH values below about 6.3–6.4 are likewise undesirable because $SO_2$ collection efficiency in the absorber may deteriorate at such lower pH's.

The pH of the absorption effluent solution, i.e., solution withdrawn from the absorber after it has been contacted with the $SO_2$-containing flue gas, should be maintained within the range of from 5.8 to 6.6, preferably from 6.0 to 6.3. Higher pH's than 6.6 are undesirable since only limited bisulfite conversion to sulfite can be accomplished during regeneration, under such conditions. Regeneration at excessively high absorber effluent pH values requires that inefficiently large volumes of solution be treated to effect the degree of bisulfite conversion required. It should be apparent that during regeneration, the pH of the absorber effluent solution is raised to a higher pH value, within the range specified for regenerated absorption solution.

Absorber effluent solution pH values that are below the lower specified limits are best avoided since such acidic solutions may decrease or limit desulfurization ($SO_2$ collection) efficiency in the absorber.

Control of the absorption effluent solution pH may be generally achieved through the amount (or flow rate) of solution diverted from the absorber for regeneration. The regenerated solution pH, on the other hand, is ordinarily controlled via the amount (or addition rate) of limestone employed to treat the solution during regeneration.

The sodium bisulfite content of the absorption effluent solution is only partially neutralized to sulfite during the regeneration, the percentage of bisulfite converted to sulfite being maintained within the range of from 35 to 70%, preferably 35 to 60%. These percentages may alternatively be expressed as fractions, being 0.35 to 0.7 and 0.35 to 0.6, respectively. Within the preferred bisulfite conversion ranges, limestone utilization (i.e., percentage of calcium carbonate in limestone that is reacted) is very high, generally 85–90%, or more.

Bisulfite conversion percentages higher than about 60–70% usually lead to poor limestone utilization efficiency and are therefore undesirable. Percentages lower than 35% are also undesirable since the amounts of absorption effluent solution that must be diverted for regeneration become uneconomically large.

During regeneration of the absorption effluent solution, the sodium bisulfite concentration should decrease by an absolute amount of from 0.05 M to 0.5 M, preferably 0.1 M to 0.3 M. If the reduction of bisulfite is below the minimum specified amount, excessively large amounts of absorption effluent solution will be required for regeneration.

Bisulfite conversions in excess of the specified amount are undesirable since the concentration of active sodium in the absorption effluent solution necessary to sustain such a decrease would be unacceptably high.

The concentration of active sodium, measured as the molar concentration of (sodium) bisulfite plus twice the molar concentration (sodium) sulfite in the absorption effluent solution is desirably maintained within the range of from 0.5 M to 0.9 M, preferably from 0.6 M to 0.9 M. Maintenance of the active sodium concentration within these ranges is advantageous for minimizing the consumption of sodium in the continuous, cyclic process of the invention. Higher active sodium concentrations ordinarily result in unacceptably high sodium consumption due to solution losses in the calcium sulfite byproduct that is discarded.

The amount of ground limestone introduced into the absorption effluent solution diverted for regeneration is significantly less than stoichiometric, based on the theoretical amount of calcium carbonate required to completely neutralize the bisulfite content of such absorption solution to sulfite. The amount of ground limestone employed during regeneration is preferably no more than about 85% of stoichiometric, more preferably from 35–80% of stoichiometric. The stoichiometric percentage of limestone, it should be noted, corresponds to the percentage of bisulfite neutralized to sulfite, if it is assumed that limestone utilization is substantially complete.

The process of this invention may be controlled even more precisely by maintaining the ratio of two of the above-noted parameters, i.e., active sodium concentration divided by the decrease in bisulfite concentration during regeneration, within certain specific limits. The active sodium concentration, expressed as the bisulfite molar concentration plus twice the sulfite molar concentration in the absorption effluent solution, divided by the decrease in molar bisulfite concentration during regeneration, is desirably maintained within the range of from about 2 to 10, and the ratio is preferably maintained from about 3 to 6.

This ratio is a useful indication of the level of active sodium in the absorption solution, for a given absolute amount of regeneration, i.e., bisulfite conversion. A high ratio corresponds to a very concentrated absorption solution, having a high level of dissolved sodium salts. A low ratio, on the other hand, indicates a relatively dilute alkali absorption solution, which if too dilute can suffer from lack of buffering capacity.

It must be stressed that when the flue gas desulfurization process is operated within the preferred limits of the above-noted critical parameters, then the process chemistry for both the absorption and regeneration aspects of the process will be controlled at an optimal, efficient level. In sodium-limestone processes described in the prior art, the efficient operation of the absorption step has generally been obtained at the cost of decreased efficiency in the corresponding regeneration step (or vice versa).

In the present invention, good absorption characteristics are maintained with the sodium sulfite-sodium bisulfite absorber solution removing most sulfur oxides, with 90% $SO_2$ removal being achievable, contained in typical flue gas streams. At the same time, regeneration of the effluent absorber solution is performed without sacrifice of its desired characteristics. Limestone utilization (percentage of calcium carbonate reacted with bisulfite) is high, typically 85–90% or more, without requiring large volumes of effluent absorber solution for treatment. The byproduct solids quality is also satisfactory, the calcium sulfite-containing solids having the desired rapid settling characteristics.

In order to facilitate achievement of the desired operating characteristics of this invention, additional operating details beyond those already discussed are described below for the absorption and regeneration procedures.

The absorption of sulfur oxides from the sulfur oxide-containing gas stream in the present invention is ordinarily carried out in an absorption tower, which is commonly called a scrubber or absorber. The sulfur oxide-containing gas stream is typically introduced at the bottom of the tower and as it passes upwards through the column is contacted with the downwards-flowing absorption solution. The treated gas stream, substantially freed of sulfur oxides, exits the absorber at or near the top and may be treated further to remove any entrained liquid droplets. The absorption tower is preferably a multistage spray tower or packed tower.

The preferred multistage spray tower desirably has at least three stages. In a preferred mode of operation, regenerated absorber solution is introduced at the top of the tower, where its relatively high pH may be used to best effect in removing any sulfur oxides still remaining in the gas stream before it exits at the top of the tower. Absorber solution that accumulates at the bottom of the tower, in the sump, is withdrawn as absorber effluent solution and the portion which is not diverted for regeneration is recycled to one or more intermediate, middle stages of the tower.

In an alternative preferred embodiment, a packed tower may be employed as the absorber. Its superior gas-liquid contact efficiency usually minimizes and sometimes eliminates the need for absorber effluent solution to be recycled back to the absorber for renewed contact with the gas stream.

It should be evident that other absorber types and flow configurations may be adapted to the present invention, depending on the particular requirements of the waste or flue gas stream being treated. Such modifications could include internal recirculation in the absorber, multiple absorption loops using absorber solutions of varying pH, introduction of regenerated absorber solution to the absorber sump, and the like. These variations applicable to the absorption operation are considered to be within the scope of the present invention.

The limestone treatment of the diverted absorber effluent solution is ordinarily carried out as a continuous operation. The proportion of absorber effluent solution that is diverted for regeneration, as opposed to being recycled to or recirculated in the absorber, may range from a fraction of the absorber solution up to the entire amount. The precise amount or proportion depends on the constraints imposed by the critical parameter values that are employed in a given desulfurization situation, i.e., absorber effluent solution pH, regenerated absorber solution pH, decrease in bisulfite concentration during regeneration, and the like.

The limestone used in the regeneration treatment of the absorber effluent solution must be ground, pulverized, or powdered, to provide for its efficient utilization. Limestone of coarse particle size is undesirable because of its propensity to become coated with calcium sulfite by-product during regeneration, which retards its dissolution. It may be introduced to the absorber effluent solution either in solid form or as an aqueous limestone slurry. The limestone is preferably ground to a particle size having a relatively narrow size distribution. Preferably, the ground limestone is substantially all (in excess of 90 wt %) smaller than No. 200 (75-$\mu$m) Sieve and, more preferably, smaller than No. 325 (45-$\mu$m) Sieve, in particle size.

Limestone employed in the method of the present invention may be any of the various commercial types available which contain natural calcium carbonate ($CaCO_3$), i.e., calcite, as the primary constituent. Limestones having relatively low amounts of magnesium as an impurity are preferred.

The reaction of limestone in the regeneration operation results in the formation of solid calcium sulfite. Sulfate may also be present in the absorber effluent solution being treated with limestone and at least some sulfate will then coprecipitate as calcium sulfate along with calcium sulfite. This has no adverse effect on the regeneration procedure. Because of the calcium sulfate coprecipitation with calcium sulfite, no special procedures are required in this invention to selectively precipitate calcium sulfate.

The reaction of absorber effluent solution with limestone is desirably carried out in a multistage reactor, although the regeneration reaction can be performed in a single stage reactor. The multistage reactor design, preferably having from two to four stages in series, promotes the efficient utilization of limestone, minimizes reaction residence time required, and facilitates the formation of byproduct calcium sulfite with good settling characteristics.

In a multistage reactor arrangement, the limestone is preferably introduced into the initial stage. It is possible, and under certain conditions desirable, to introduce the limestone into more than one of the initial stages. Such a procedure permits more precise control of the calcium sulfite supersaturation concentration in these initial stages, thereby minimizing the likelihood of crystal nucleation predominating over crystal growth and causing the formation of small crystals with poor settling and filtration characteristics.

The multistage reactor arrangement also provides for good control of crystal growth, especially when seed crystals are introduced into the initial reaction stages. A preferred seeding procedure is the recycle of solid byproduct crystals, or a slurry of the same, that are recovered in the subsequent solids-liquid separation.

The multistage reactor is desirably the cascade type, in which the overflow slurry from one stage flows by gravity into the next stage in the series. The reactor stages are desirably provided with agitators that provide good mixing of the slurry while minimizing crystal breakage.

The multistage reactor is desirably operated in a manner which results in the slurry overflow from the final stage in the series having a solids content maintained below 4 weight %.

The temperature of the absorber effluent solution during the regeneration reaction is not critical, and no adjustments to its temperature during regeneration are necessary. The absorber effluent solution is generally warm, from its contact with the hot waste gas stream, and it is typically at a temperature of from 30° C. to 70° C. when introduced to the limestone regeneration reactor. No temperature adjustments are required, moreover, for the regenerated absorber solution before it is returned to the absorber.

The total residence time of the absorber solution in the regeneration reactor is preferably from about 0.5 to 5 hours. In the preferred multistage reactor, especially one having four stages in series, the total residence time is preferably maintained at from 1 to 3 hours.

The slurry that is withdrawn from the limestone reactor is subjected to conventional liquid-solids separation procedures to separate the calcium sulfite-containing solid byproduct from the absorber solution. This is best accomplished in a thickener, with the concentrated slurry underflow from the thickener, containing 15 to 35 wt % solids, being filtered or centrifuged to dewater the solids. During this operation, the cake is usually washed with water to recover entrained sodium values. Wash water and liquor from the liquid-solids separation are generally returned to the thickener for further clarification. The filter or centrifuge cake containing the calcium sulfite byproduct is normally discarded.

As mentioned previously, a portion of the thickener underflow slurry may be recycled to the initial stages of the multistage reactor to provide seed crystals.

The essentially solids-free absorber solution that overflows from the thickener is ordinarily passed to a surge or holding tank before it is returned to the absorber. The regenerated solution in the hold tank is mixed with make-up water and soda ash ($Na_2CO_3$) or caustic soda (NaOH) to compensate for normal process sodium and water losses, such as in the discarded solids and in the gaseous absorber effluent stream. The regenerated absorber solution is then returned, by pumping, to the absorber.

EXAMPLE

The Example illustrates the application of a preferred embodiment of the present invention to the desulfurization of flue gas from a large boiler utilizing high sulfur coal. The process is operated continuously, and normal steady state conditions are assumed for purposes of the Example. The drawing illustrates a schematic flow diagram of this preferred embodiment; reference numerals in the drawing are included in the process description which follows.

In the absorption section, flue gas 1 from the boiler is introduced at a rate of about 320,000 acfm (151 $m^3$/sec) and at a temperature of 280° F. (138° C.) in a countercurrent flow spray tower absorber 2 which has three stages. In the absorber 2, sulfur dioxide is absorbed into aqueous solution containing both sodium sulfite and sodium bisulfite, and the treated flue gas 3 which exits from the absorber has substantially all (in excess of 90%) sulfur dioxide removed. The treated flue gas 3 exits at a rate of about 266,000 acfm (126 $m^3$/sec) and at a temperature of 121° F. (49° C.). Before being vented, the treated flue gas stream 3 is passed through a mist eliminator (not shown) to remove entrained absorber solution from the gas stream.

Regenerated absorber solution 4 is introduced continuously at the top stage of the absorber tower, at a constant rate of about 2100 gpm (130 liters/sec). The regenerated absorber solution 4 has a pH of about 6.6.

Aqueous solution which accumulates in the absorber tower sump is removed and split into two streams, the first stream 5 being recycled to the absorber tower 2 and the second stream 6 being diverted to the limestone regeneration section of the process.

The recycled stream 5 is introduced into the absorber 2 at the middle stage, below the introduction point for the regenerated absorber solution 4, and is thus recontacted with the flue gas passing upwards through the tower. Recycled absorber solution 5 is recirculated at a rate of about 6000 gpm (380 liters/sec).

The remaining portion of absorber solution removed from the absorber tower bottom is diverted as stream 6 and subjected to regeneration with limestone in the regeneration section. The effluent solution 6 is diverted at a constant flow rate of about 2100 gpm (130 liters/sec).

The pH of the absorber solution removed from the absorber (for recirculation and for regeneration) is about 6.0 at full load. It should be understood that this pH value will increase, within the range of about 6.0 to 6.6, when load conditions decrease as during dynamic turndown when a reduced volume of flue gas is being treated. This pH increase occurs because the amount of effluent solution 6 being diverted remains constant. In an alternative process control scheme, the effluent absorber solution pH value could be kept constant by varying the flow rate of absorber effluent solution diverted for regeneration, as necessary.

The diverted absorber solution 6, rich in sodium bisulfite, is regenerated with limestone 7 in a multi-stage reactor. The regeneration reactor has four stages 8, 9, 10, 11 in series and is a cascade type, in which overflow slurry from the first stage 8 is introduced by gravity into the second stage 9, and so forth for the remaining stages 10 and 11. Each of the four stages is equipped with an agitator to assure good mixing.

Limestone for use in this regeneration is prepared by wet ball milling of limestone lumps to recover ground limestone that is substantially all less than 325 (45 μm) Sieve in size and typically analyzes as 90% by weight $CaCO_3$. The ground limestone 7 is introduced as an aqueous slurry, containing about 30-40% by weight solids, and is apportioned between the initial two reactor stages 8, 9 to minimize super-saturation of calcium sulfite in the first reactor stage.

The ground limestone 7 is introduced at an overall rate of about 10,400 lb/hr (4700 kg/hr). The precise introduction rate is adjusted via a control system which maintains the pH of the regenerated absorber solution 4 at the desired pH of 6.6.

In addition to the limestone, a portion of calcium sulfite solids 12, described in more detail below, is recycled to the first reactor stage 8 to serve as seed crystals. This seeding procedure promotes the growth of large calcium sulfite crystals with good settling characteristics.

Residence time of the diverted absorber effluent solution 6 in the four reactor stages 8, 9, 10, 11 is about two hours.

The amount of calcium sulfite solids recycled to the first reactor stage 8 for seeding purposes is controlled so that the solids concentration in the last stage 11 is about 1 to 2% by weight.

The slurry overflow 13 from the last reactor stage 11 is passed by gravity flow to a thickener 14 for liquid-solid separation. The thickener 14 is operated such that the underflow is a concentrated slurry containing about 20% by weight solids.

As mentioned previously, a portion 12 of the concentrated slurry underflow is recycled to the first stage 8 of the limestone reactor. The bulk of the thickener slurry underflow 15 is passed to a rotary vacuum filter 16, which produces a dewatered filter cake 17 and a mother liquor 18. The filter cake 17, which is about 50-55% by weight solids that are predominantly calcium sulfite, is discarded. The mother liquor 18, which also contains any wash water used to wash the filter cake, is returned to the thickener 14 for further clarification.

Overflow solution 19 from the thickener 14 is transferred to a surge tank 20. Water 21 and soda ash 22, preferably a 30 wt % solution, are introduced to the thickener overflow solution in the surge tank 20 to compensate for sodium losses in the filter cake and as absorber solution make up. The proper sodium, i.e., level of active sodium in the absorber solution, and water balance in the absorption system is best controlled by the introduction of soda ash and water at this point. The active sodium in the regenerated absorber solution is preferably maintained at a concentration of about 0.5 M. It should be noted that the amounts of make-up soda ash and water are relatively small and thus have a minimal effect on the pH of the regenerated absorber solution to which they are introduced.

Aqueous solution 4 from the surge tank is a sodium sulfite-rich solution whose pH is about 6.6. This pH is maintained via the limestone feed addition to reactor stages 8 and 9. This solution 4 is returned to the absorber 2, via pumping, as regenerated absorber solution.

The decrease in bisulfite concentration, after the absorber effluent solution 6 has been subjected to limestone regeneration and is ready for return to the absorber as regenerated solution 4, is about 0.17 M. The percentage of sodium bisulfite in the absorber effluent solution that is converted to sulfite by the limestone treatment is about 53%.

The limestone utilization in the process as described above is in excess of 90%, thus providing for a highly efficient operation.

We claim:

1. A method for the continuous desulfurization of flue gas in an absorber with an aqueous solution of sodium sulfite and sodium bisulfite and regeneration of such solution with limestone, said method comprising: contacting absorber effluent solution having a pH within the range of from 5.8 to 6.6 with sufficient ground limestone to raise the pH to a value within the range of from 6.3 to 7.0 and to convert from 35 to 70% of the solution bisulfite content to sulfite, separating the byproduct solids from the limestone-treated solution, and returning the regenerated solution to the absorber; the molar concentration of active sodium for the absorber effluent solution, measured as the sum of the bisulfite molar concentration plus twice the sulfite molar concentration, being maintained within the range of from 0.5 M to 0.9 M, and the amount of limestone being less than stoichiometric, based on the theoretical calcium carbonate required to completely neutralize the bisulfite content of such absorber effluent solution to sulfite.

2. The method of claim 1 wherein the active sodium concentration of the absorber effluent solution is maintained at from 0.6 M to 0.9 M.

3. The method of claim 1 wherein the bisulfite concentration of the absorber effluent solution is decreased during regeneration by an amount of from 0.05 M to 0.5 M.

4. The method of claim 3 wherein the bisulfite concentration decrease during regeneration is from 0.1 M to 0.3 M.

5. The method of claim 1 wherein the percentage of solution bisulfite content that is converted to sulfite during regeneration is from 35 to 60%.

6. The method of claim 1 wherein the pH value of the absorber effluent solution, before regeneration, is from 6.0 to 6.3.

7. The method of claim 1 wherein the pH value of the regenerated absorber solution, after regeneration, is from 6.4 to 6.8.

8. The method of claim 1 wherein no more than 85% of a stoichiometric amount of limestone is contacted with the absorber effluent solution.

9. The method of claim 8 wherein from 35 to 80% of a stoichiometric amount of limestone is contacted with the absorber effluent solution.

10. The method of claim 1 wherein the particle sizing of the ground limestone is substantially all smaller than No. 200 (75-μm) Sieve and has a relatively narrow particle size distribution.

11. The method of claim 10 wherein the ground limestone is substantially all smaller than No. 325 (45-μm) Sieve in particle size.

12. The method of claim 1 wherein the reaction of limestone with absorber effluent solution is carried out in multiple stages.

13. The method of claim 12 wherein from 2 to 4 reaction stages are employed.

14. The method of claim 12 wherein limestone is introduced into the first stage.

15. The method of claim 12 wherein at least 3 reaction stages are employed and wherein limestone is introduced into more than one of the initial stages.

16. The method of claim 12 wherein the concentration of solids in the final reactor stage effluent is maintained below 4 wt %.

17. The method of claim 12 wherein the multiple reactor stages are of the cascade, overflow type.

18. The method of claim 12 wherein the residence time of absorber solution in the reactor is from about 0.5 to 5 hours.

* * * * *

UNITED STATES PATENT AND TRADEMARK OFFICE
CERTIFICATE OF CORRECTION

PATENT NO. : 4,410,500
DATED : October 18, 1983
INVENTOR(S) : Kuei-Hsiung Wang, Robert J. Biolchini and L. Karl Legatski It is certified that error appears in the above—identified patent and that said Letters Patent is hereby corrected as shown below:

Column 2, line 17, "0.5M", first occurrence, should read

-- 0.05M --.

*Signed and Sealed this*

*Twenty-seventh* Day of *March 1984*

[SEAL]

*Attest:*

GERALD J. MOSSINGHOFF

*Attesting Officer*     *Commissioner of Patents and Trademarks*